(12) United States Patent
Sugawara et al.

(10) Patent No.: US 7,153,384 B2
(45) Date of Patent: Dec. 26, 2006

(54) LASER RAY TRANSMITTING COLORED THERMOPLASTIC RESIN COMPOSITION AND METHOD OF LASER WELDING

(75) Inventors: Shuji Sugawara, Osaka (JP); Yoshiteru Hatase, Osaka (JP)

(73) Assignee: Orient Chemical Industries, Ltd. (JP)

( * ) Notice: Subject to any disclaimer, the term of this patent is extended or adjusted under 35 U.S.C. 154(b) by 234 days.

(21) Appl. No.: 10/702,674

(22) Filed: Nov. 5, 2003

(65) Prior Publication Data

US 2004/0144483 A1    Jul. 29, 2004

(30) Foreign Application Priority Data

Sep. 24, 2002   (JP)   ............................. 2003-331910
Nov. 6, 2002    (JP)   ............................. 2002-322184

(51) Int. Cl.
  *B32B 37/14*   (2006.01)
(52) U.S. Cl. ..................... 156/272.8; 524/155; 524/159; 524/189; 534/608
(58) Field of Classification Search ............. 156/272.2, 156/272.8; 524/155, 159, 189, 608
See application file for complete search history.

(56) References Cited

U.S. PATENT DOCUMENTS 3,945,837 A  *  3/1976   Miyata et al. ........... 106/31.43

(Continued)

FOREIGN PATENT DOCUMENTS

EP        0 837 082 A1   4/1998

(Continued)

OTHER PUBLICATIONS

Machine Translation of JP09189807A2.*

*Primary Examiner*—Justin Fischer
*Assistant Examiner*—Christopher Schatz
(74) *Attorney, Agent, or Firm*—McGlew & Tuttle, PC

(57) ABSTRACT

Laser ray transmitting colored thermoplastic resin composition containing a dis-azo salt forming dye consisting of an anionic component from a dis-azo acid dye and an organic ammonium component, said acid dye being represented by Formula (1) below, $$R^1\text{—}N\text{=}N\text{-}E\text{-}N\text{=}N\text{—}R^2; \quad (1)$$

E: (2), (3), (4); $R^1$, $R^2$: aryl, pyrazolone; one or more of E, $R^1$, $R^2$ have sulfonic acid group,

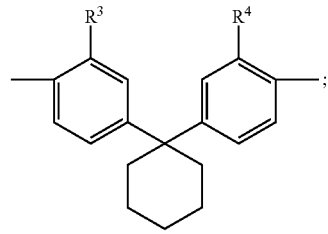
(2)

$R^3$, $R^4$: hydrogen atom, alkyl, sulfonic acid group,   (3)

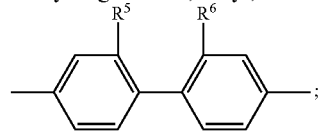

$R^5$, $R^6$: hydrogen atom, sulfonic acid group,   (4)

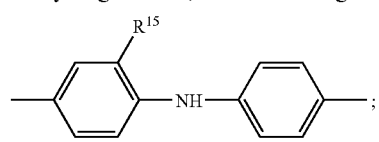

$R^{15}$: sulfonic acid group.

Method of laser welding wherein a contact portion of a laser ray transmitting material comprising the laser ray transmitting colored thermoplastic resin composition above and a laser ray absorbing material is welded by irradiating laser ray so that the laser ray passes through the laser ray transmitting material and is absorbed in the laser ray absorbing material with the laser ray transmitting material and the laser ray absorbing material in contact with each other.

14 Claims, 1 Drawing Sheet

U.S. PATENT DOCUMENTS

| | | |
|---|---|---|
| 5,639,809 A | 6/1997 | Matsuzaki et al. |
| 2003/0045618 A1* | 3/2003 | Koshida et al. ............. 524/358 |
| 2003/0088076 A1* | 5/2003 | Koshida et al. ............. 534/653 |
| 2004/0045663 A1* | 3/2004 | Katayama et al. ....... 156/272.8 |

FOREIGN PATENT DOCUMENTS

| | | |
|---|---|---|
| JP | 09189807 A2 * | 7/1997 |
| JP | 11-170371 | 6/1999 |
| JP | 2000-266928 | 9/2000 |
| JP | 2002-60644 | 2/2002 |
| JP | 2002-080648 | 3/2002 |
| WO | WO 02/057353 A2 | 7/2002 |

\* cited by examiner

LASER RAY TRANSMITTING COLORED THERMOPLASTIC RESIN COMPOSITION AND METHOD OF LASER WELDING

CROSS-REFERENCE TO RELATED APPLICATION

This application is related to copending U.S. application Ser. No. 10/702,670 (corresponding to Japanese Application No. 2002-322183) filed simultaneously herewith and of common inventor-ship herewith and also entitled LASER RAY TRANSMITTING COLORED THERMOPLASTIC RESIN COMPOSITION AND METHOD OF LASER WELDING, the entire contents of which are hereby incorporated herein by reference.

BACKGROUND OF THE INVENTION

1. Field of the Invention

The present invention relates to a laser ray transmitting colored thermoplastic resin composition containing a dis-azo salt forming dye and a method of laser welding.

2. Description of the Prior Art

Laser welding of synthetic resin materials can, for example, be conducted as described below. As shown in FIG. 1, one member incorporating a laser ray transmitting material and another member incorporating a laser ray absorbing material are brought into contact with each other. When an irradiating laser ray is passed from the laser ray transmitting material side to the laser ray absorbing material, the laser ray that has passed through the laser ray transmitting material is absorbed in the laser ray absorbing material and generates heat. By this heat, the laser ray absorbing material is made molten around the portion that has absorbed the laser ray, and the laser ray transmitting material is also made molten, the resins of the two members fuse together, and upon cooling sufficient welding strength is obtained and the laser ray transmitting material and the laser ray absorbing material are joined firmly. Features of laser welding include the capability of welding without bringing the laser ray generation portion in contact with the portion to be welded, the minimal thermal effect on the surrounding portion because the heating is localized, freedom from the problem of mechanical vibration, the capability of welding of fine portions and structures, high reproducibility, maintenance of high air-tightness, high welding strength, inconspicuous welded portion, and no generation of dust, etc.

Traditionally, resin parts have been joined together by clamping with clamping parts (bolts, screws, clips, etc.), adhesion using adhesives, vibration welding, ultrasonic welding, etc. According to laser welding, secure welding is achieved by simple operation to provide strength equivalent to or more than expected by conventional welding, and in addition labor saving, productivity improvements, production cost reductions, etc. can be achieved because vibration and heat have minimal effects. With these features, laser welding is suitable for the joining of functional components, electronic components, etc., for which the avoidance of the influence of vibration and heat is desired in, for example, the automobile industry, electric/electronic industry and other fields, and is applicable to the joining of resin parts of complex shapes.

As a technology concerning laser welding, Japanese Patent Laid-Open No. HEI-11-170371 [Patent Document 1] describes a method of laser welding comprising a process wherein a laser ray is irradiated so that it focuses on a portion where an opaque member comprising a laser ray absorbing thermoplastic synthetic resin and a colorless transparent member comprising a laser ray transmitting thermoplastic synthetic resin are in contact with each other. In this case, however, when viewed from the colorless transparent member side, the welded portion differs from the non-welded portion in color and smoothness, posing a problem of poor appearance.

Additionally, Japanese Patent Laid-Open No. 2000-266928 [Patent Document 2] and Japanese Patent Laid-Open No. 2002-060644 [Patent Document 3] employs dis-azo dyes as color filter colorants. However, these dis-azo dyes are faulty in that their dyes are relatively liable to sublimation. Therefore, during their blending in synthetic resins (engineering plastics, in particular, which require high temperatures for molding), coloring and molding, it is likely that dye decomposition products are produced and cause discoloration and physical property reductions. Additionally, their anti-migration quality and chemical resistance are insufficient and they lack practical applicability for resin compositions for molding, such as engineering plastics.

[Patent Document 1] Japanese Patent Laid-Open No. HEI-11-170371

[Patent Document 2] Japanese Patent Laid-Open No. 2000-266928

[Patent Document 3] Japanese Patent Laid-Open No. 2002-060644

The present invention has been developed in view of the aforementioned problems in the prior art, and is intended to provide a laser ray transmitting colored thermoplastic resin composition and a method of laser welding that do not pose color fading of the colored thermoplastic synthetic resin member in the heat treatment process prior to laser welding of the resin member and permit laser welding with substantially no dye sublimation.

SUMMARY OF THE INVENTION

For accomplishing the above objective, the laser ray transmitting colored thermoplastic resin composition of the present invention contains a dis-azo salt forming dye.

The dis-azo salt forming dye in the laser ray transmitting colored thermoplastic resin composition of the present invention is preferably a salt forming dye consisting of an anionic component from a dis-azo acid dye and an organic ammonium component, and the acid dye is preferably represented by Formula (1) below.

$$R^1{-}N{=}N{-}E{-}N{=}N{-}R^2 \quad (1)$$

In Formula (1),

E represents a group represented by Formula (2), (3) or (4) below, each of $R^1$ and $R^2$ independently represents an aryl group not having or having a substituent, or a pyrazolone group not having or having a substituent, one, two or more of E, $R^1$ and $R^2$ have a sulfonic acid group as a substituent.

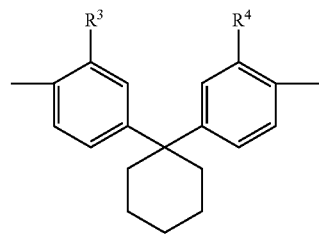

(2)

In Formula (2), each of $R^3$ and $R^4$ independently represents a hydrogen atom, an alkyl group, or a sulfonic acid group.

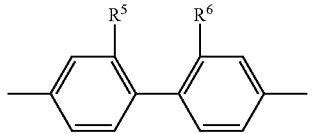

(3)

In Formula (3), each of $R^5$ and $R^6$ independently represents a hydrogen atom or a sulfonic acid group.

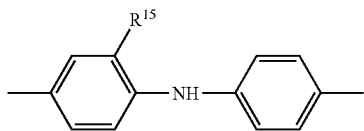

(4)

In Formula 4, $R^{15}$ represents a sulfonic acid group.

Additionally, the laser ray transmitting colored thermoplastic resin composition of the present invention is preferably a composition wherein the organic ammonium component in the aforementioned dis-azo salt forming dye is represented by Formula (5) or (6) below.

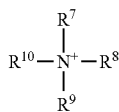

(5)

In Formula (5), each of $R^7$ through $R^{10}$ independently represents a hydrogen atom, an alkyl group, a cycloalkyl group, an alkoxyalkyl group, an alkanol group, an aryl group not having or having a substituent, an aralkyl group not having or having a substituent, or a group represented by Formula (A) below.

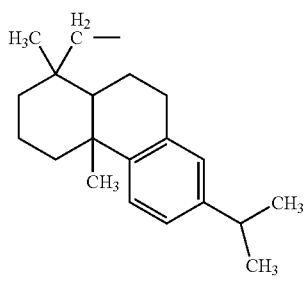

(A)

or

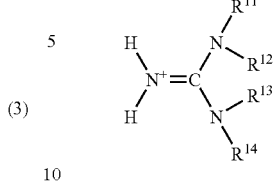

(6)

In Formula (6), each of $R^{11}$ through $R^{14}$ independently represents a hydrogen atom or an aryl group not having or having a substituent.

The method of laser welding of the present invention is characterized in that a contact portion of a laser ray transmitting material comprising any of the aforementioned laser ray transmitting colored thermoplastic resin compositions and a laser ray absorbing material are welded by an irradiating laser ray so that the laser ray passes through the laser ray transmitting material and is absorbed in the laser ray absorbing material with the laser ray transmitting material and the laser ray absorbing material in contact with each other.

The laser ray transmitting colored thermoplastic resin composition of the present invention well transmits light at a wavelength range from about 800 nm for a semiconductor laser to about 1100 nm for a YAG laser, i.e., laser ray, exhibits high fastness such as to heat and light, has a good anti-migration property, chemical resistance, etc., and exhibits a brilliant color. The colored thermoplastic synthetic resin member of this laser ray transmitting colored thermoplastic resin composition permits the heat treatment process prior to welding without fading of the color of the resin member and the laser welding process with substantially no sublimation of dye.

According to the laser welding method of the present invention, a contact portion of a laser ray transmitting material and a contact portion of a laser ray absorbing material can be welded by an irradiating laser ray so that the laser ray passes through the laser ray transmitting material and is absorbed in the laser ray absorbing material with the laser ray transmitting material and the laser ray absorbing material in contact with each other. The laser ray transmitting material in this method of laser welding enables laser welding without undergoing fading of the color of the resin member in the heat treatment process prior to laser welding, and with substantially no dye sublimation.

DETAILED DESCRIPTION OF THE INVENTION

Figure 1:
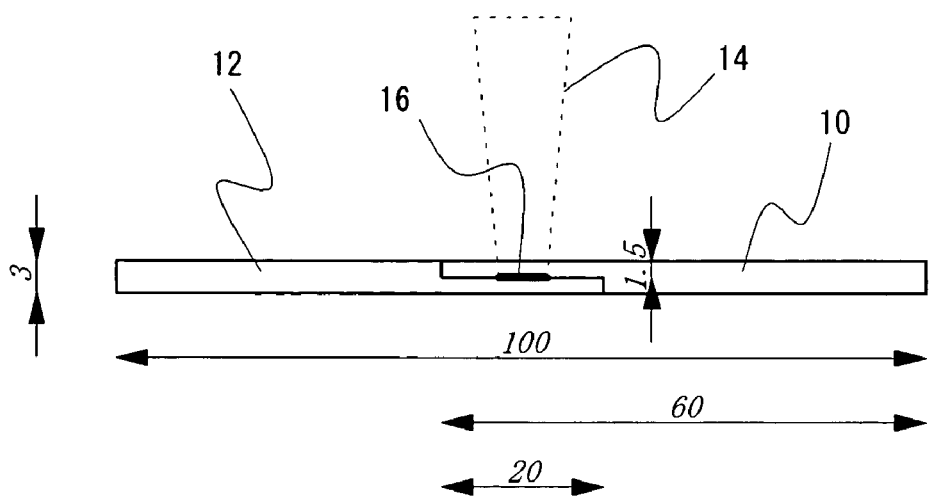
FIG. 1 is a lateral view of the laser welding test.

A dis-azo salt forming dye in the present invention can be obtained by a salt-forming reaction of an anion from a dis-azo acid dye and an organic ammonium ion (e.g., cations from primary amines, secondary amines, tertiary amines, guanidines, rosin amines, etc.). This salt-forming reaction may employ a commonly known ionic reaction. For example, an acid dye component having two sulfonic acid groups is dispersed in water, an organic amine component in a ratio of 2.0 to 2.3 mols per mol of the dye is dissolved in aqueous hydrochloric acid; this solution is added drop by drop to the aqueous dispersion, and the reaction is carried out with stirring for several hours. By filtering this reaction mixture and washing the cake filtered off with water and drying it, a dis-azo salt forming dye of the present invention can be obtained.

The acid dye for obtaining the anionic component of a dis-azo salt forming dye in the present invention may be represented by Formula (1) above. In Formula (1), E represents a group represented by Formula (2), (3) or (4) above, each of $R^1$ and $R^2$ independently represents an aryl group [e.g., phenyl groups, naphthyl groups, etc.] not having or having a substituent (e.g., alkyl group [e.g., alkyl groups having 1 to 8 carbon atoms, such as methyl, ethyl, propyl, isopropyl, n-butyl, tert-butyl, n-pentyl, isopentyl, hexyl, heptyl or octyl], aryl group [e.g., phenyl groups, naphthyl groups, etc.] not having or having a substituent [e.g., alkyls having 1 to 4 carbon atoms, halogens such as Cl or Br, etc.], hydroxyl group, sulfonic acid group, carboxyl groups, halogens [e.g., Cl, Br, etc.], alkoxy group [e.g., alkoxy groups having 1 to 8 carbon atoms, such as methoxy, ethoxy and propoxy], amino group, or anilide group not having or having a substituent [e.g., alkyls having 1 to 4 carbon atoms, halogens such as Cl or Br, etc.]) on the ring thereof, or a pyrazolone group not having or having a substituent (e.g., alkyl group [e.g., alkyl groups having 1 to 8 carbon atoms, such as methyl, ethyl, propyl, isopropyl, n-butyl, tert-butyl, n-pentyl, isopentyl, hexyl, heptyl and octyl], aryl groups [e.g., phenyl groups, naphthyl groups, etc.] not having or having a substituent [e.g., alkyls having 1 to 4 carbon atoms, halogens such as Cl or Br, etc.], hydroxyl group, carboxyl group, sulfonic acid group, halogen [e.g., Cl, Br, etc.], or alkoxy groups [e.g., alkoxy groups having 1 to 8 carbon atoms, such as methoxy, ethoxy and propoxy]), one or two or more of E, $R^1$ and $R^2$ have a sulfonic acid group as a substituent, and each of the sulfonic acid groups may be —$SO_3H$ or in the form of a salt of an alkali metal (Li, Na, K, etc.) or an alkaline earth metal (Mg, Ca, Ba, etc.) (—$SO_3^-$[alkali metal or alkaline earth metal] etc.). When the anionic component of the dis-azo salt forming dye in the present invention is represented using Formula (1) above, one or more sulfonic acid groups in Formula (1) are —$SO_3^-$.

In Formula (2) above, each of $R^3$ and $R^4$ independently represents a hydrogen atom, an alkyl group [e.g., alkyl groups having 1 to 8 carbon atoms, such as methyl, ethyl, propyl, isopropyl, n-butyl, tert-butyl, n-pentyl, isopentyl, hexyl, heptyl or octyl], or a sulfonic acid group.

In Formula (3), each of $R^5$ and $R^6$ independently represents a hydrogen atom or a sulfonic acid group.

Examples of particularly preferred anionic components of dis-azo salt forming dyes in the present invention are shown by means of Formula (1) above in Table 1, which examples are not to be construed as limiting the present invention.

TABLE 1

| | $R^1$ | $R^2$ | $R^3$ | $R^4$ | $R^5$ | $R^6$ | $R^{15}$ |
|---|---|---|---|---|---|---|---|
| Z-1 | 4-hydroxy-3-methyl-1-sulfonato-naphthyl | 7-hydroxy-1-methyl-6-sulfonato-naphthyl | | | H | H | |
| Z-2 | 7-hydroxy-1-methyl-3-sulfonato-naphthyl (1-OH, 7-OH, methyl, $SO_3^-$) | 1-hydroxy-2-methyl-7-hydroxy-3-sulfonato-naphthyl | $CH_3$ | $CH_3$ | | | |
| Z-3 | 3-methyl-1-phenyl-5-hydroxy-pyrazolyl | 3-methyl-1-phenyl-5-hydroxy-pyrazolyl | | | | | $SO_3^-$, $SO_3^-$ |

TABLE 1-continued

| | R¹ | R² | R³ | R⁴ | R⁵ | R⁶ | R¹⁵ |
|---|---|---|---|---|---|---|---|
| Z-4 | 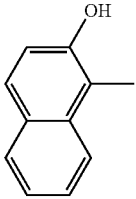 | 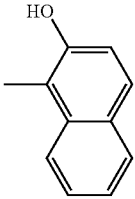 | | | SO₃⁻ | SO₃⁻ | |
| Z-5 | 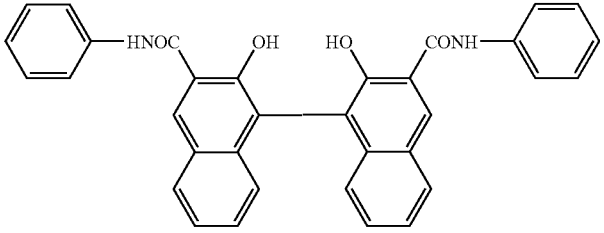 | | | | SO₃⁻ | SO₃⁻ | |
| Z-6 | 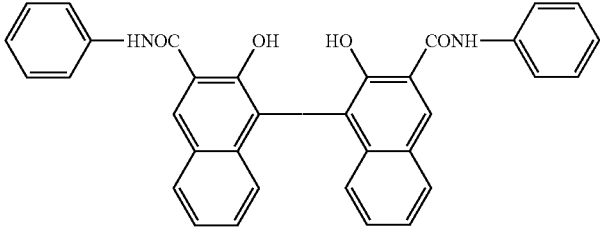 | | | | | | SO₃⁻ |
| Z-7 | 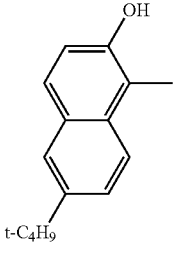 | 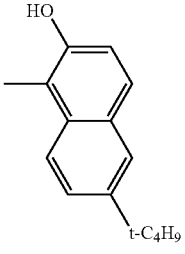 | | | | | SO₃⁻ |
| Z-8 | 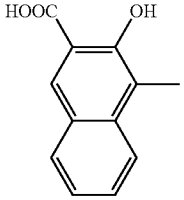 | 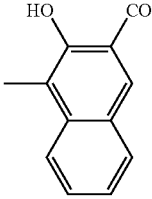 | | | | | SO₃⁻ |
| Z-9 | 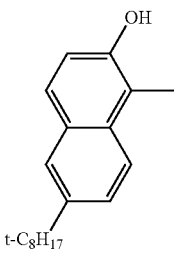 | 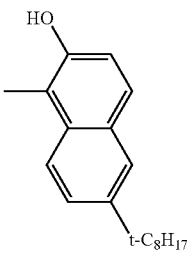 | | | | | SO₃⁻ |

The aforementioned dis-azo salt forming dye used in the present invention has a color such as yellow, orange, red, blue or violet. As colorants for the laser ray transmitting colored thermoplastic resin composition of the present invention, dis-azo salt forming dyes having various colors may be used singly or in combination of two or more kinds thereof. As a colorant for the laser ray transmitting colored thermoplastic resin composition of the present invention, there may be used in combination one kind or two kinds or more of dyes that have an absorption band only outside the visible light absorption band of the dis-azo salt forming dye or have an absorption band in and outside the visible light absorption band of the dis-azo salt forming dye, and that allows light transmission in the wavelength band of laser ray (wavelength from 800 nm to 1200 nm), along with the aforementioned dis-azo salt forming dye. By blending dyes as described above, i.e., by combining, for example, a yellow and/or red colorant out of the aforementioned dis-azo salt forming dyes and other blue colorants, it is possible to obtain colorants having various colors such as green (e.g., yellow+blue), violet (e.g., red+blue) and black (e.g., yellow+red+blue). Additionally, by combining, for example, a blue or violet dis-azo salt forming dye and another yellow and/or red colorant, it is possible to obtain colorants having various colors such as green (e.g., blue+yellow), violet (e.g., blue+red) and black (e.g., blue+yellow+red, or violet+yellow).

The organic ammonium component in a dis-azo salt forming dye in the present invention may be represented by Formula (5) or (6) above.

In Formula (5), each of $R^7$ through $R^{10}$ independently represents, a hydrogen atom, an alkyl group (e.g., alkyl groups having 1 to 12 carbon atoms that may be branched, such as methyl, ethyl, n-propyl, isopropyl, n-butyl, isobutyl, tert-butyl, n-pentyl, isopentyl, tert-pentyl, hexyl, heptyl, octyl, nonyl, decyl, undecyl or dodecyl), a cycloalkyl group (e.g., cycloalkyl groups having 3 to 8 carbon atoms, such as cyclopropyl, cyclopentyl, cyclohexyl and cycloheptyl, or dihydroaziethylamine residues), an alkoxyalkyl group (e.g., alkoxyalkyl groups having 2 to 20 carbon atoms, such as [methoxy, ethoxy, propoxy, butoxy, pentyloxy, hexyloxy, or octyloxy, etc.]-[methyl, ethyl, propyl, butyl, pentyl, or octyl, etc.] etc., i.e., ethoxymethyl, methoxyethyl, etc.), an aryl group (e.g., phenyl, lower-alkyl-substituted phenyls, halogenated phenyls, naphthyls, aminonaphthyls) not having or having a substituent [e.g., amino group, lower (1 to 4 carbon atoms) alkyl groups, halogens such as Cl or Br], an aralkyl group (e.g., benzyl group, α-methylbenzyl group, α,α-dimethylbenzyl group, α-butylbenzyl group, phenethyl group, naphthylalkyl group [e.g., naphthylmethyl, naphthylethyl, etc.]) not having or having a substituent [e.g., amino group, alkyl groups having 1 to 4 carbon atoms, halogens such as Cl or Br], or an alkanol group (e.g., $CH_2OH$, $-C_2H_4OH$, $-C_3H_6OH$, etc.).

In Formula (6), each of $R^{11}$ to $R^{14}$ independently represents a hydrogen atom or an aryl group (e.g., phenyls, lower-alkyl-substituted phenyls, halogenated phenyls, naphthyls, aminonaphthyls) not having or having a substituent [e.g., amino group, lower (1 to 4 carbon atoms) alkyl groups, halogens such as Cl or Br].

Organic ammonium components represented by Formulas (5) and (6) above can be obtained from organic amines exemplified below, which amines, however, are not to be construed as limiting the present invention.

Specifically, there may be mentioned aliphatic amines such as hexylamine, pentylamine, octylamine, 2-ethylhexylamine, di-(2-ethylhexyl)amine and dodecylamine; alicyclic amines such as cyclohexylamine, di-cyclohexylamine and dihydroaziethylamine; alkoxyalkylamines such as 3-propoxypropylamine, di-(3-ethoxypropyl)amine, 3-butoxypropylamine, octoxypropylamine and 3-(2-ethylhexyloxy)propylamine; naphthylamines such as α-naphthylamine, β-naphthylamine, 1,2-naphthylenediamine, 1,5-naphthylenediamine and 1,8-naphthylenediamine; naphthylalkylamines such as 1-naphthylmethylamine; alkanol-group-containing amines such as N-cyclohexylethanolamine, N-dodecylethanolamine and N-dodecylimino-di-ethanol; and guanidines (derivatives) such as 1,3-diphenylguanidine, 1-o-tolylguanidine and di-o-tolylguanidine.

Of the organic ammonium components represented by Formula (5) or (6) above, those that are particularly preferred are shown in Table 2.

TABLE 2

| $R^7$ $R^8$ $R^9$ $R^{10}$ | $R^{11}$ | $R^{12}$ | $R^{13}$ | $R^{14}$ |
|---|---|---|---|---|
| S-1 | 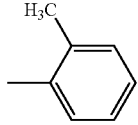 | H | 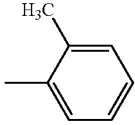 | H |
| S-2 H H H | 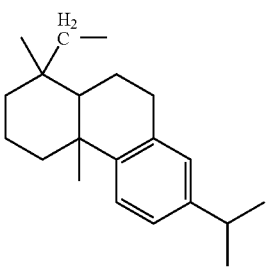 | | | |

TABLE 2-continued

| | $R^7$ | $R^8$ | $R^9$ | $R^{10}$ | $R^{11}$ | $R^{12}$ | $R^{13}$ | $R^{14}$ |
|---|---|---|---|---|---|---|---|---|
| S-3 | H | H | H | —(CH$_2$)$_3$—O—CH$_2$(C$_2$H$_5$)—CH$_2$—C$_4$H$_9$ | | | | |
| S-4 | | | | | (phenyl)—H | | (phenyl)—H | |
| S-5 | H | H | H | (methylnaphthyl) | | | | |

As examples of thermoplastic resins in the laser ray transmitting colored thermoplastic resin composition of the present invention, there may be mentioned laser ray transmitting resins in use as pigment dispersing agents, commonly known resins in use as carrier resins for master batches or colored pellets, etc. As representative examples thereof, there may be mentioned polyethylene resin, polypropylene resin, polystyrene resin, polymethylpentene resin, methacrylic resin, acrylic polyamide resin, EVOH (ethylene vinyl alcohol) resin, polycarbonate resin, polyester resins such as polyethyleneterephthalate (PET) and polybutylene terephthalate (PBT), polyamide resin (PA), polyacetal resin, polyvinyl chloride resin, polyvinylidene chloride resin, polyphenylene oxide resin, polyphenylene sulfide resin, polyallylate resin, polyallylsulfone resin, fluorine resin, liquid crystal polymer, etc.

Copolymer resins of two kinds or more of the aforementioned thermoplastic resin may also be used. As such copolymer resins, there may be mentioned, for example, AS (acrylonitrile-styrene) copolymer resin, ABS (acrylonitrile-butadiene-styrene) copolymer resin, AES (acrylonitrile-EPDM-styrene) copolymer resin, PA-PBT copolymer, PET-PBT copolymer resin, PC-PBT copolymer resin, PC-PA copolymer resin, etc.

As examples of other thermoplastic resins, there may be mentioned thermoplastic elastomers such as polystyrene thermoplastic elastomers, polyoleffin thermoplastic elastomers, polyurethane thermoplastic elastomers and polyester thermoplastic elastomers; and synthetic waxes or natural waxes that are based on the aforementioned resins. These thermoplastic resins are not subject to limitation as to molecular weight.

The thermoplastic resin in the laser ray transmitting colored thermoplastic resin composition of the present invention is preferably a polyester resin or a polypropylene resin.

As polyester resins, there may be mentioned, for example, polyethylene terephthalate resin obtained by a polymerization condensation reaction of terephthalic acid and ethylene glycol, and polybutylene terephthalate resin obtained by a polymerization condensation reaction of terephthalic acid and butylene glycol. As examples of other polyester resins, there may be mentioned copolymers resulting from the substitution of some terephthalic acid components (e.g., 15 mol % or less [e.g., 0.5 to 15 mol %], preferably 5 mol % or less [e.g., 0.5 to 5 mol %]) and/or some ethylene glycol components (e.g., 15 mol % or less [e.g., 0.5 to 15 mol %], preferably 5 mol % or less [e.g., 0.5 to 5 mol %]) in the aforementioned polyester resin. Two or three kinds or more of polyester resins may be blended.

As examples of substituent component of some terephthalic acid component, there may be mentioned one kind or two kinds or more of bifunctional carboxylic acids such as aromatic dicarboxylic acids such as isophthalic acid, naphthalenedicarboxylic acid, diphenyldicarboxylic acid, diphenoxyethanedicarboxylic acid, diphenyletherdicarboxylic acid, and diphenylsulfonedicarboxylic acid;

alicyclic dicarboxylic acids such as hexahydroterephthalic acid and hexahydroisophthalic acid;

aliphatic dicarboxylic acids such as adipic acid, sebacic acid and azelaic acid; and p-β-hydroxyethoxybenzoic acid.

As examples of substituent component of some ethylene glycol component, there may be mentioned glycols such as trimethylene glycol, tetramethylene glycol, hexamethylene glycol, decamethylene glycol, neopentyl glycol, diethylene glycol, 1,1-cyclohexanedimethylol, 1,4-cyclohexanedimethylol, 2,2-bis(4'-β-hydroxyethoxyphenyl)propane and bis (4'-β-hydroxyethoxyphenyl)sulfonic acid, and one or more kinds of multifunctional compounds of these functional derivatives etc. For applications in electronic parts and vehicle parts, polybutylene terephthalate resin is preferred.

As polypropylene resin, there may be mentioned, for example, commonly widely available propylene homopolymers, propylene-ethylene block copolymers, propylene-ethylene random copolymers, etc. Polypropylene resins may be used singly or in blends of two kinds or of three or more kinds.

The amount of colorant used in the laser ray transmitting colored thermoplastic resin composition of the present invention may, for example, be 0.01 to 10% by weight relative to thermoplastic resin. The amount is preferably 0.1 to 5% by weight, more preferably 0.1 to 1% by weight.

$T_{colored\ resin}/T_{noncolored\ resin}$, i.e., the ratio of $T_{colored\ resin}$, the transmittance for a laser ray having a wavelength of 940 nm in the laser ray transmitting colored thermoplastic resin composition of the present invention, and $T_{noncolored\ resin}$, the transmittance for a laser ray having a wavelength of 940 nm in a noncolored resin composition of the same composition but without a colorant, may, for example, be 0.5 or more, and is preferably 0.7 to 1.1, more preferably 0.8 to 1.1.

The laser ray transmitting colored resin composition of the present invention may contain appropriate amounts of various reinforcing materials according to its application and intended use. Any reinforcing material can be used, as long as it is usable for ordinary reinforcement of synthetic resins.

For example, glass fiber, carbon fiber, other inorganic fibers, and organic fibers (aramid, polyphenylene sulfide, nylon, polyester, liquid crystal polymer, etc.), etc. can be used, with preference given to glass fiber for reinforcement of resins that require transparency. The fiber length of glass fiber is preferably 2 to 15 mm and the fiber diameter is preferably 1 to 20 μm. The form of glass fiber is not subject to limitation, and may be of any one, e.g., roving or milled fiber. These glass fibers may be used singly or in combination of two or more kinds. Their content is preferably 5 to 120% by weight relative to 100% by weight of thermoplastic resin. If the content is less than 5% by weight, a sufficient glass fiber-reinforcing effect is unlikely to be attained; if the content exceeds 120%. by weight, moldability is likely to decrease. Their content is preferably 10 to 60% by weight, particularly preferably 20 to 50% by weight.

The laser ray transmitting colored thermoplastic resin composition of the present invention may be formulated with various additives where necessary. Such additives include, for example, coloring auxiliaries, dispersing agents, filling agents, stabilizers, plasticizers, modifier, ultraviolet absorbents or light stabilizers, antioxidants, antistatic agents, lubricants, mold-releasing agents, crystallization promoters, crystal nucleating agents, flame retardants, and elastomers for improving impact resistance.

The laser ray transmitting colored thermoplastic resin composition of the present invention is obtained by blending raw materials by an optionally chosen method of blending. It is generally preferable that these blending ingredients be homogenized to the maximum possible extent. Specifically, for example, all raw materials are blended and homogenized in a mechanical mixer such as a blender, kneader, Banbury mixer, roll mixer or extruder to yield a colored thermoplastic resin composition. Alternatively, after some raw materials are blended in a mechanical mixer, the remaining ingredients are added, followed by further blending and homogenization, to yield a resin composition. Additionally, previously dry-blended raw materials may be kneaded and homogenized in a molten state in a heated extruder, then extruded into a needle, which needle is then cut into desired length to yield a colored granular resin composition (colored pellets).

A master batch of the laser ray transmitting colored thermoplastic resin composition of the present invention is obtained by an optionally chosen method. For example, a master batch can be obtained by blending a master batch base thermoplastic resin powder or pellets and a colorant in a mechanical mixer such as a tumbler or super-mixer, and then thermally melting and pelletizing or coarsely granulating the ingredients in an extruder, batch-wise kneader, roll kneader, or the like. A master batch can also be obtained by, for example, adding a colorant to a master batch thermoplastic resin while remaining in solution after synthesis, and then removing the solvent.

Molding of the laser ray transmitting colored thermoplastic resin composition of the present invention can be achieved by various procedures in common use. For example, the laser ray transmitting colored thermoplastic resin composition of the present invention can be molded using colored pellets in a processing machine such as an extruder, injection molding machine or roll mill, and can also be molded by blending transparent thermoplastic resin pellets or powder, a milled colorant, and where necessary various additives, in an appropriate mixer, and molding this blend using a processing machine. It is also possible, for example, to add a colorant to a monomer containing an appropriate polymerization catalyst, and polymerize this blend into desired thermoplastic resin, which resin is molded by an appropriate method. Any commonly used method of molding can be adopted, e.g., injection molding, extrusion molding, compression molding, foaming molding, blow molding, vacuum molding, injection blow molding, rotation molding, calender molding, and solution casting. By such molding, laser ray transmitting materials in various shapes can be obtained.

Additionally, the laser ray transmitting colored thermoplastic resin composition of the present invention can be used as a multi-color colorant by blending it with other colorants of good laser ray transmittance that are capable of imparting colors to resin, and that have various colors.

As examples of such other colorants that are capable of imparting colors to resin, there may be mentioned organic dyes/pigments that exhibit chromatic colors such as yellow, orange, red, brown, green, blue, violet and so on, and that transmit laser ray. They are not subject to structural limitation, and are exemplified by various organic dyes/pigments such as of the azomethine series, anthraquinone series, quinacridone series, dioxazine series, diketopyrrolopyrrole series, anthrapyridone series, isoindolinone series, indathrone series, perinone series, perylene series, indigo series, thioindigo series, quinophthalone series, quinoline series, triphenylmethane series, etc.

For example of combinations of colorants, a orange laser ray transmitting colored thermoplastic resin composition can be obtained by using in combination another laser ray transmitting colorant, in red color, and a yellow laser ray transmitting colored thermoplastic resin composition containing the aforementioned dis-azo salt forming dye, and a violet laser ray transmitting colored thermoplastic resin composition can be obtained by using in combination another laser ray transmitting colorant, in blue color, and a red laser ray transmitting colored thermoplastic resin composition containing the aforementioned dis-azo salt forming dye.

Additionally, a black laser ray transmitting colored thermoplastic resin composition can be obtained by using in combination the aforementioned dis-azo salt forming dye, in red and yellow colors, and another laser ray transmitting colorant, in blue color. Of the laser ray transmitting colored thermoplastic resin composition of the present invention, black resin compositions are industrially important.

The method of laser welding of the present invention comprises welding a contact portion of a laser ray transmitting material comprising the aforementioned laser ray transmitting colored thermoplastic colored resin composition and a contact portion of a laser ray absorbing material by an irradiating laser ray so that the laser ray passes through the laser ray transmitting material and is absorbed in the laser ray absorbing material with the laser ray transmitting material and the laser ray absorbing material in contact with each other.

The laser ray absorbing material preferably comprises a laser ray absorbing colored resin composition (preferably thermoplastic resin composition) using at least carbon black as a laser ray absorbing material and also as a black colorant. In this case, it is preferable to use carbon black having a primary particle diameter of 20 to 30 nm. Using such carbon black, it is possible to obtain a highly dispersed laser ray absorbing material that absorbs a laser ray at high absorption rates.

The laser ray absorbing material may be a laser ray absorbing colored resin composition not incorporating carbon black but incorporating another colorant and another laser ray absorbing material (or another laser ray absorbing material-colorant).

The amount of colorant used in such a laser ray absorbing colored resin composition may be, for example, 0.01 to 10% by weight relative to the resin (preferably thermoplastic resin), and is preferably 0.05 to 5% by weight. The laser ray absorbing material can be produced in the same way as the laser ray transmitting material except for the containment of a laser ray absorbing material.

EXAMPLES

The present invention is hereinafter described in more detail by means of, but is not limited to, the following examples. In the description below, "part(s) by weight" is referred to as "part(s)."

In Examples 1 to 7, laser ray transmitting colored thermoplastic resin compositions incorporating polybutylene terephthalate resin are described. For comparison, Comparative Examples 1 to 3 are given. In Examples 8 and 9, laser ray transmitting colored thermoplastic resin compositions incorporating polypropylene resin are described. For comparison, Comparative Examples 4 and 5 are given.

Table 3 shows the colorants prepared in Production Examples 1 to 7 and used in Examples, and the colorants prepared in Comparative Production Examples 1 and 2 and used in Comparative Examples. The anionic components of the acid dyes for the respective Production Examples correspond to the anionic components of the acid dyes shown in Table 1, and the organic amines for the respective Production Examples correspond to the organic ammonium components shown in Table 2. The salt forming dyes of each of C.I. Acid Blue 80 (anthraquinone acid dye), C.I. Acid Red 143 (anthrapyridone acid dye) and C.I. Acid Red 249 (monoazo acid dye) and organic amines in Production Examples 4 and 5 and Comparative Production Examples 1 and 2 were obtained by a salt-forming reaction of each acid dye and organic amine.

Each of the colorants of Production Examples 1 to 3 and 6 and Comparative Production Examples 1 and 2 comprises a single salt forming dye, whereas the colorants of Production Examples 4, 5 and 7 are black colorants prepared by blending a plurality of salt forming dyes according to the content ratios shown in the relevant column using a simple mechanical mixer.

TABLE 3

|  | Acid dye | Organic amine | Content ratio (ratio by weight) |
| --- | --- | --- | --- |
| Production Example 1 | Z-1 | S-1 | — |
| Production Example 2 | Z-3 | S-1 | — |
| Production Example 3 | Z-4 | S-4 | — |
| Production Example 4 | C.I.ACID BLUE 80 | S-1 | 4 |
|  | Z-1 | S-1 | 3 |
|  | Z-3 | S-1 | 3 |
| Production Example 5 | C.I.ACID BLUE 80 | S-1 | 4 |
|  | C.I.ACID RED 143 | S-1 | 3 |
|  | Z-3 | S-1 | 3 |
| Production Example 6 | Z-6 | S-1 | — |
| Production Example 7 | Z-6 | S-1 | 6 |
|  | Z-3 | S-1 | 1 |
| Comparative Production Example 1 | C.I.ACID RED 361 | S-1 | — |
| Comparative Production Example 2 | C.I.ACID RED 249 | S-1 | — |

First, laser ray transmitting colored thermoplastic resin compositions incorporating polybutylene terephthalate resin are described below.

Example 1

PBT (polybutylene terephthalate resin) . . . 400 g (manufactured by Mitsubishi Engineering Plastics Corporation, product number: 5008AS)

Colorant of Production Example 1 . . . 0.80 g

The above ingredients were placed in a stainless steel tumbler and mixed with stirring for 1 hour. The blend obtained was injection-molded by an ordinary method at a cylinder temperature of 260° C. and mold temperature of 80° C. using an injection molding machine (manufactured by Toyo Machinery & Metal Co., Ltd., product number: Si-50); a uniformly colored red test piece having good appearance and surface gloss was obtained.

Example 2

PBT . . . 400 g (manufactured by Mitsubishi Engineering Plastics Corporation, product number: 5008AS)

Colorant of Production Example 2 . . . 0.80 g

The above ingredients were placed in a stainless steel tumbler and mixed with stirring for 1 hour. The blend obtained was injection-molded by an ordinary method at a cylinder temperature of 260° C. and mold temperature of 80° C. using an injection molding machine (manufactured by Toyo Machinery & Metal Co., Ltd., product number: Si-50); a uniformly colored yellow test piece having good appearance and surface gloss was obtained.

Example 3

PBT . . . 400 g (manufactured by Mitsubishi Engineering Plastics Corporation, product number: 5008AS)

Colorant of Production Example 3 . . . 0.80 g

The above ingredients were placed in a stainless steel tumbler and mixed with stirring for 1 hour. The blend obtained was injection-molded by an ordinary method at a cylinder temperature of 260° C. and mold temperature of 80° C. using an injection molding machine (manufactured by Toyo Machinery & Metal Co., Ltd., product number: Si-50); a uniformly colored red test piece having good appearance and surface gloss was obtained.

Example 4

PBT . . . 400 g (manufactured by Mitsubishi Engineering Plastics Corporation, product number: 5008AS)

Colorant of Production Example 4 . . . 2.40 g

The above ingredients were placed in a stainless steel tumbler and mixed with stirring for 1 hour. The blend obtained was injection-molded by an ordinary method at a cylinder temperature of 260° C. and mold temperature of 80° C. using an injection molding machine (manufactured by Toyo Machinery & Metal Co., Ltd., product number: Si-50); a uniformly colored black test piece having good appearance and surface gloss was obtained.

Example 5

PBT . . . 400 g (manufactured by Mitsubishi Engineering Plastics Corporation, product number: 5008AS)

Colorant of Production Example 5 . . . 2.40 g

The above ingredients were placed in a stainless steel tumbler and mixed with stirring for 1 hour. The blend obtained was injection-molded by an ordinary method at a cylinder temperature of 260° C. and mold temperature of 80° C. using an injection molding machine (manufactured by Toyo Machinery & Metal Co., Ltd., product number: Si-50); a uniformly colored black test piece having good appearance and surface gloss was obtained.

Example 6

PBT . . . 400 g (manufactured by Mitsubishi Engineering Plastics Corporation, product number: 5008AS)

Colorant of Production Example 6 . . . 1.20 g

The above ingredients were placed in a stainless steel tumbler and mixed with stirring for 1 hour. The blend obtained was injection-molded by an ordinary method at a cylinder temperature of 260° C. and mold temperature of 80° C. using an injection molding machine (manufactured by Toyo Machinery & Metal Co., Ltd., product number: Si-50); a uniformly colored bluish violet test piece having good appearance and surface gloss was obtained.

Example 7

PBT . . . 400 g (manufactured by Mitsubishi Engineering Plastics Corporation, product number: 5008AS)

Colorant of Production Example 7. . . 2.40 g

The above ingredients were placed in a stainless steel tumbler and mixed with stirring for 1 hour. The blend obtained was injection-molded by an ordinary method at a cylinder temperature of 260° C. and mold temperature of 80° C. using an injection molding machine (manufactured by Toyo Machinery & Metal Co., Ltd., product number: Si-50); a uniformly colored black test piece having good appearance and surface gloss was obtained.

Comparative Example 1

PBT . . . 400 g (manufactured by Mitsubishi Engineering Plastics Corporation, product number: 5008AS)

Colorant of Comparative Production Example 1 . . . 0.80 g

The above ingredients were placed in a stainless steel tumbler and mixed with stirring for 1 hour. The blend obtained was injection-molded by an ordinary method at a cylinder temperature of 260° C. and mold temperature of 80° C. using an injection molding machine (manufactured by Toyo Machinery & Metal Co., Ltd., product number: Si-50); a red test piece was obtained.

Comparative Example 2

PBT . . . 400 g (manufactured by Mitsubishi Engineering Plastics Corporation, product number: 5008AS)

C.I. Pigment Red 144 (dis-azo pigment) . . . 0.80 g

The above ingredients were placed in a stainless steel tumbler and mixed with stirring for 1 hour. The blend obtained was injection-molded by an ordinary method at a cylinder temperature of 260° C. and mold temperature of 80° C. using an injection molding machine (manufactured by Toyo Machinery & Metal Co., Ltd., product number: Si-50); a poorly dispersed red test piece was obtained.

Comparative Example 3

PBT . . . 400 g (manufactured by Mitsubishi Engineering Plastics Corporation, product number: 5008AS)

C.I. Pigment Yellow 93 (dis-azo pigment) . . . 0.80 g

The above ingredients were placed in a stainless steel tumbler and mixed with stirring for 1 hour. The blend obtained was injection-molded by an ordinary method at a cylinder temperature of 260° C. and mold temperature of 80° C. using an injection molding machine (manufactured by Toyo Machinery & Metal Co., Ltd., product number: Si-50); a yellow test piece was obtained.

Next, laser ray transmitting colored thermoplastic resin compositions incorporating polypropylene resin are described below.

Example 8

GF-PP (fiber-reinforced polypropylene resin containing 30% by weight of grass fiber) . . . 400 g (manufactured by Japan Polychem, product number: HG30U)

Colorant of Production Example 1 . . . 0.80 g

The above ingredients were placed in a stainless steel tumbler and mixed with stirring for 1 hour. The blend obtained was injection-molded by an ordinary method at a cylinder temperature of 220° C. and mold temperature of 40° C. using an injection molding machine (manufactured by Toyo Machinery & Metal Co., Ltd., product number: Si-50); a uniformly colored red test piece having good appearance and surface gloss was obtained.

Example 9

GF-PP . . . 400 g (manufactured by Japan Polychem, product number: HG30U)

Colorant of Production Example 2 . . . 0.80 g

The above ingredients were placed in a stainless steel tumbler and mixed with stirring for 1 hour. The blend obtained was injection-molded by an ordinary method at a cylinder temperature of 220° C. and mold temperature of 40° C. using an injection molding machine (manufactured by Toyo Machinery & Metal Co., Ltd., product number: Si-50); a uniformly colored yellow test piece having good appearance and surface gloss was obtained.

Comparative Example 4

GF-PP . . . 400 g (manufactured by Japan Polychem, product number: HG30U)

C.I. Pigment Yellow 147 (anthraquinone dye) . . . 0.80 g

The above ingredients were placed in a stainless steel tumbler and mixed with stirring for 1 hour. The blend obtained was injection-molded by an ordinary method at a cylinder temperature of 220° C. and mold temperature of 40° C. using an injection molding machine (manufactured by Toyo Machinery & Metal Co., Ltd., product number: Si-50); a yellow test piece was obtained.

Comparative Example 5

GF-PP . . . 400 g (manufactured by Japan Polychem, product number: HG30U)

Colorant of Comparative Production Example 2 . . . 0.80 g

The above ingredients were placed in a stainless steel tumbler and mixed with stirring for 1 hour. The blend obtained was injection-molded by an ordinary method at a cylinder temperature of 220° C. and mold temperature of 40° C. using an injection molding machine (manufactured by Toyo Machinery & Metal Co., Ltd., product number: Si-50); a red test piece was obtained.

Test Procedures

The laser ray transmitting colored thermoplastic resin compositions obtained in Examples 1 to 9 and Comparative Examples 1 to 5 and a similarly molded uncolored polybutylene terephthalate resin (PBT) test piece and fiber-reinforced polypropylene resin (PP) test piece were evaluated by the methods described below. The results are shown in Tables 4 and 5 below.

(1) Property of Transmittance

Each test piece was set to a spectrophotometer (manufactured by JASCO Corporation, product number: V-570 model), and its transmittance was determined in the 1.5 mm thick portion of the test piece 10 in FIG. 1 over a wavelength range of $\lambda=400$ to 1200 nm. Tables 4 and 5 show the transmittances of respective test pieces for semiconductor laser ray at a wavelength of 940 nm.

(2) Sublimation Resistance

A test piece with a white PET (polyethylene terephthalate) film applied thereto was placed in an oven and allowed to stand at 160° C. for 3 hours. Thereafter, the PET film was removed from the test piece and applied to a colorless transparent OHP (overhead projector) sheet to facilitate observation.

If the dye had not migrated to the PET film, the dye was judged to have anti-sublimation quality.

(3) Heat Resistance

In the injection molding in Examples 1 to 9 and Comparative Examples 1 to 5 above, a blend of ingredients was subjected to an ordinary shot, and thereafter the remaining portion of the blend was retained in a cylinder at a cylinder temperature of 260° C. for polybutylene terephthalate resin, or in a cylinder at 220° C. for polypropylene resin, for 15 minutes; injection molding was then conducted to yield test pieces.

If the discoloration/fading of the color of the test piece obtained by retaining in the cylinder for 15 minutes had not advanced compared to the color of the test piece obtained by a conventional shot, the test piece was judged to be resistant to heat.

(4) Preparation of Laser Ray Absorbing Test Pieces for Laser Welding Test and Laser Welding Test A laser ray absorbing test piece (laser ray absorbing material) incorporating polybutylene terephthalate resin was prepared as described below.

PBT . . . 400 g (manufactured by Mitsubishi Engineering Plastics Corporation, product number: 5008AS)

Carbon black . . . 2.00 g

The above ingredients were placed in a stainless steel tumbler and mixed with stirring for 1 hour. The blend obtained was injection-molded by an ordinary method at a cylinder temperature of 260° C. and mold temperature of 80° C. using an injection molding machine (manufactured by Toyo Machinery & Metal Co., Ltd., product number: Si-50); a uniformly colored black laser ray absorbing test piece (PBT) having good appearance and surface gloss was obtained.

A laser ray absorbing test piece incorporating fiber-reinforced polypropylene resin was prepared as described below.

GF-PP . . . 400 g (manufactured by Japan Polychem Corporation, product number: HG30U)

Carbon black . . . 0.80 g

The above ingredients were placed in a stainless steel tumbler and mixed with stirring for 1 hour. The blend obtained was injection-molded by an ordinary method at a cylinder temperature of 220° C. and mold temperature of 40° C. using an injection molding machine (manufactured by Toyo Machinery & Metal Co., Ltd., product number: Si-50); a uniformly colored black laser ray absorbing test piece (PP) having good appearance and surface gloss was obtained.

Figure 2:
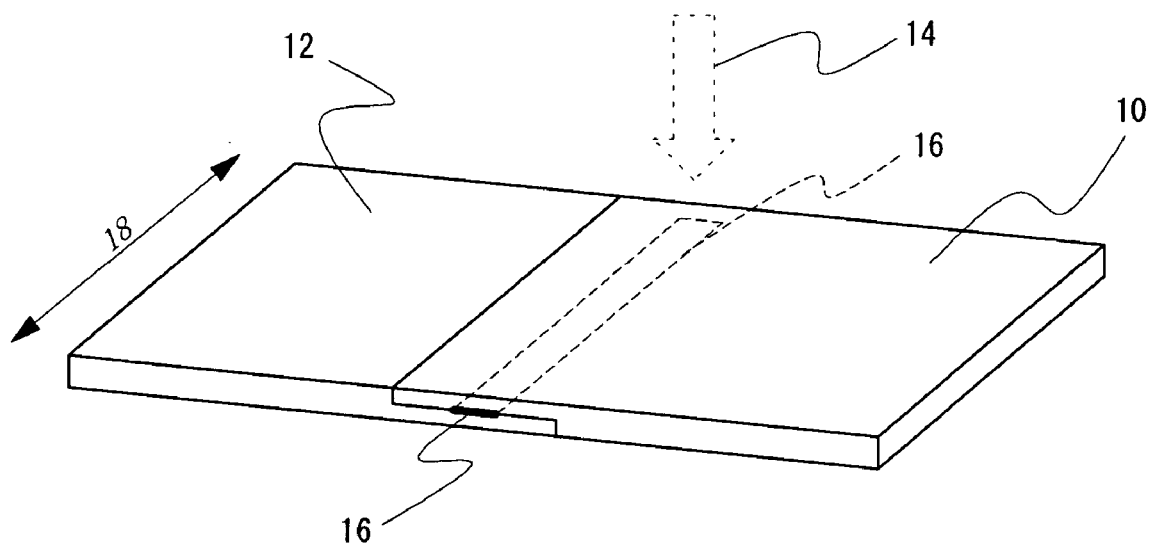
FIG. 2 is an oblique view of the laser welding test.

As shown in FIG. 1 (lateral view) and FIG. 2 (oblique view), each test piece 10 of Examples 1 to 7 and Comparative Examples 1 to 3 and laser ray absorbing test piece (PBT) 12, and each test piece 10 of Examples 8 and 9 and Comparative Examples 4 and 5 and laser ray absorbing test piece (PP) 12 [all 60 mm length×18 mm width×3 mm thickness (1.5 mm thickness for 20 mm of the length)], were superposed with respective portions 20 mm length×18 mm width×1.5 mm thickness in contact with each other.

The superposed portion was irradiated with a laser beam 14 from above the test piece (in the Figure) using a diode laser of 30 W output [wavelength: 940 nm, continuous] (manufactured by Fine Devices Company), while scanning at a scanning speed of 750 mm/min in the lateral direction (direction perpendicular to the plane of FIG. 1).

If the laser ray passes through the test piece 10 and is absorbed in the laser ray absorbing test piece 12, the laser ray absorbing test piece 12 would generate heat, by which heat the laser ray absorbing test piece 12 is made molten around the portion that has absorbed the laser ray, and the test piece 10 is also made molten, the resins of the two test pieces fuse together, and upon cooling the two pieces are joined together. In FIG. 2, 16 indicates the welded portion.

(5) Tensile Strength Test

The welded product obtained in (4) above was subjected to a tensile strength test between the test piece 10 side and the laser ray absorbing test piece 12 side in the longitudinal direction (left-right direction in FIG. 1) at a speed of 10 mm/min in accordance with JIS-K7113-1995 using a tensile tester (AG-50kNE, manufactured by Shimadzu Corporation), in order to determine its tensile welding strength.

TABLE 4

| | Color | Colorant content (% by weight) | (1) Transmittance (%) | (2) Sublimation Resistance | (3) Heat resistance | (4) Laser welding test | (5) Tensile strength test (Mpa) |
|---|---|---|---|---|---|---|---|
| PBT resin | | 0 | 37 | — | — | — | — |
| Example 1 | Red | 0.2 | 32 | Good | Good | No problem | 24.6 |
| Example 2 | Yellow | 0.2 | 35 | Good | Good | No problem | 25.4 |
| Example 3 | Red | 0.2 | 33 | Good | Good | No problem | 25.0 |
| Example 4 | Black | 0.6 | 32 | Good | Good | No problem | 24.8 |
| Example 5 | Black | 0.6 | 32 | Good | Good | No problem | 24.6 |
| Example 6 | Bluish Violet | 0.3 | 30 | Good | Good | No problem | 24.0 |
| Example 7 | Black | 0.6 | 31 | Good | Good | No problem | 24.2 |
| Comparative Example 1 | Red | 0.2 | 29 | Unacceptable | Unacceptable | No problem | 24.1 |
| Comparative Example 2 | Red | 0.2 | — | — | — | Burn stain | — |
| Comparative Example 3 | Yellow | 0.2 | 33 | Unacceptable | Good | No problem | 24.9 |

TABLE 5

| | Color | Colorant content (% by weight) | (1) Transmittance (%) | (2) Sublimation Resistance | (3) Heat resistance | (4) Laser welding test | (5) Tensile strength test (Mpa) |
|---|---|---|---|---|---|---|---|
| PP resin | | 0 | 48 | — | — | — | — |
| Example 8 | Red | 0.2 | 47 | Good | Good | No problem | 31.0 |
| Example 9 | Yellow | 0.2 | 47 | Good | Good | No problem | 30.8 |
| Comparative Example 4 | Yellow | 0.2 | 44 | Unacceptable | Unacceptable | No problem | 28.1 |
| Comparative Example 5 | Red | 0.2 | 44 | Unacceptable | Unacceptable | No problem | 28.3 |

What is claimed is:

1. A method of laser welding characterized in that a contact portion of a laser ray transmitting material comprising a laser ray transmitting colored thermoplastic resin composition and a laser ray absorbing material is welded by an irradiating laser ray so that the laser ray passes through the laser ray transmitting material and is absorbed in the laser ray absorbing material with the laser ray transmitting material and the laser ray absorbing material in contact with each other, said laser ray transmitting colored thermoplastic resin composition containing a dis-azo salt forming dye which consists of an anionic component from a dis-azo acid dye and an organic ammonium component, said acid dye being represented by Formula (1) below,

$R^1-N=N-E-N=N-R^2$     (1)

in Formula (1),
E represents a group represented by Formula (2), (3) or (4) below,
each of $R^1$ and $R^2$ independently represents an aryl group not having or having a substituent, or a pyrazolone group not having or having a substituent,
one or two or more of E, $R^1$ and $R^2$ have a sulfonic acid group as a substituent,

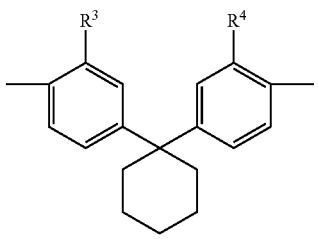

in Formula (2), each of $R^3$ and $R^4$ independently represents a hydrogen atom, an alkyl group, or a sulfonic acid group,

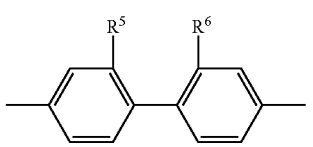

in Formula (3), each of R⁵ and R⁶ independently represents a hydrogen atom or a sulfonic acid group, (4)

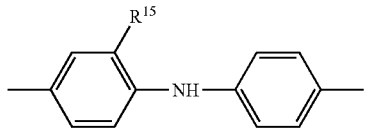

in Formula 4, R¹⁵ represents a sulfonic acid group.

2. The method of laser welding of claim 1, wherein said laser ray absorbing material comprises a laser ray absorbing colored resin composition incorporating at least carbon black as a colorant.

3. Method of laser welding a contact portion of a laser ray transmitting material comprising a laser ray transmitting colored thermoplastic resin composition to a corresponding contact portion of a laser ray absorbing material, which comprises passing an irradiating laser ray through the laser ray transmitting material and absorbing the laser ray in the laser ray absorbing material while the contact portion of the laser ray absorbing material and the contact portion of the laser ray transmitting material are in contact with each other sufficiently to weld together the laser ray transmitting material and the laser ray absorbing material, wherein the laser ray transmitting colored thermoplastic resin composition contains a dis-azo salt forming dye having heat resistance to color fading and substantially no dye sublimation, said dye comprising an anionic component from a dis-azo acid dye and an organic ammonium component, said acid dye being represented by Formula (1) below,

R¹—N=N-E-N=N-R²    (1)

in Formula (1),

E represents a group represented by Formula (2), (3) or (4) below, each of R¹ and R² independently represents an aryl group not having or having a substituent, or a pyrazolone group not having or having a substituent, one or two or more of E, R¹ and R² have a sulfonic acid group as a substituent, (2)

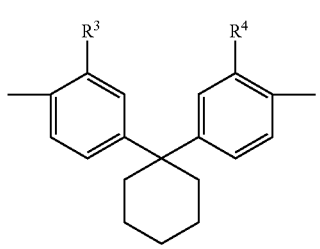

in Formula (2), each of R³ and R⁴ independently represents a hydrogen atom, an alkyl group, or a sulfonic acid group, (3)

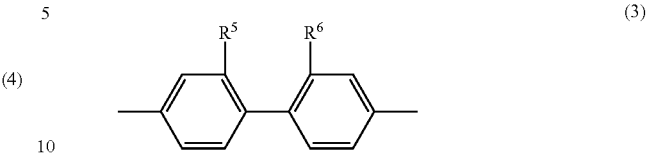

in Formula (3), each of R⁵ and R⁶ independently represents a hydrogen atom or a sulfonic acid group, (4)

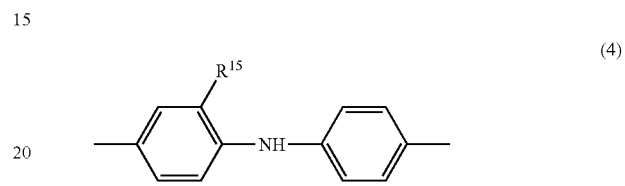

in Formula 4, R¹⁵ represents a sulfonic acid group.

4. Method of claim 3 wherein the laser ray absorbing material comprises a laser ray absorbing colored thermoplastic resin composition which includes carbon black as a colorant.

5. The method of laser welding of claim 1, wherein the organic ammonium component m said dis-azo salt forming dye is represented by Formula (5) or (6) below, (5)

in Formula (5), each of R⁷ through R¹⁰ independently represents a hydrogen atom, an alkyl group, a cycloalkyl group, an alkoxyalkyl group, an alkanol group, an aryl group not having or having a substituent, an aralkyl group not having or having a substituent, or a group represented by Formula (A) below, (A)

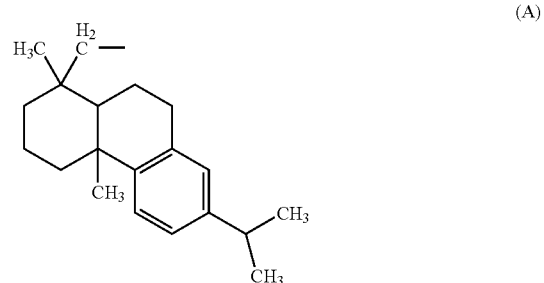

or (6)

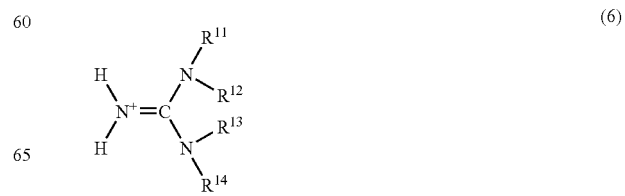

in Formula (6), each of $R^{11}$ through $R^{14}$ independently represents a hydrogen atom or an aryl group not having or having a substituent.

6. The method of laser welding of claim 1, wherein the organic ammonium component in said dis-azo salt forming dye is represented by Formula (6) below,

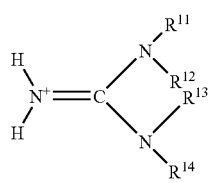

(6)

in Formula (6), each of $R^{11}$ through $R^{14}$ independently represents a hydrogen atom or an aryl group not having or having a substituent.

7. The method of laser welding of claim 1, wherein the organic ammonium component m said dis-azo salt forming dye is represented by Formula (5) below,

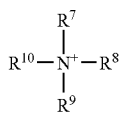

(5)

in Formula (5), each of $R^7$ through $R^9$ represents a hydrogen atom, $R^{10}$ represents a group represented by Formula (A) below,

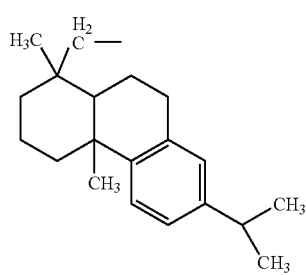

(A)

8. The method of laser welding of claim 1, wherein said thermoplastic resin is a polybutylene terephthalate resin.

9. The method of laser welding of claim 1, wherein said thermoplastic resin is a polypropylene resin.

10. The method of laser welding of claim 3, wherein the organic ammonium component in said dis-azo salt forming dye is represented by Formula (5) or (6) below,

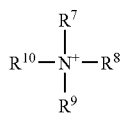

(5)

in Formula (5), each of $R^7$ through $R^{10}$ independently represents a hydrogen atom, an alkyl group, a cycloalkyl group, an alkoxyalkyl group, an alkanol group, an aryl group not having or having a substituent, an aralkyl group not having or having a substituent, or a group represented by Formula (A) below,

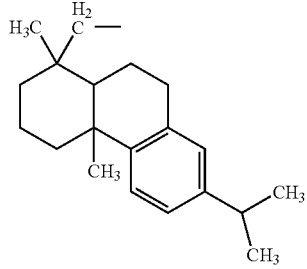

(A)

or

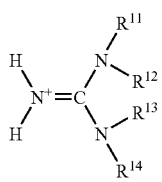

(6)

in Formula (6), each of $R^{11}$ through $R^{14}$ independently represents a hydrogen atom or an aryl group not having or having a substituent.

11. The method of claim 3, wherein the organic ammonium component in said dis-azo salt forming dye is represented by Formula (6) below,

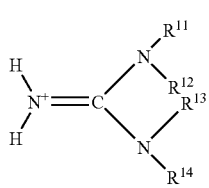

(6)

in Formula (6), each of $R^{11}$ through $R^{14}$ independently represents a hydrogen atom or an aryl group not having or having a substituent.

12. The method of laser welding of claim 3, wherein the organic ammonium component m said dis-azo salt forming dye is represented by Formula (5) below,

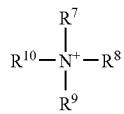
(5)

in Formula (5), each of $R^7$ through $R^9$ represents a hydrogen atom, $R^{10}$ represents a group represented by Formula (A) below.

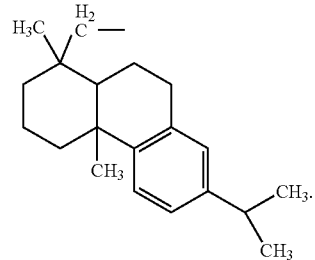
(A)

13. The method of laser welding of claim 7, wherein said thermoplastic resin is a polybutylene terephthalate resin.

14. The method of laser welding of claim 3, wherein said thermoplastic resin is a polypropylene resin.

* * * * *